United States Patent
Zhao et al.

(10) Patent No.: US 12,203,898 B2
(45) Date of Patent: Jan. 21, 2025

(54) METHOD, SYSTEM, DEVICE, AND MEDIUM FOR ONLINE STRESS MONITORING WITHOUT BASELINE DATA BASED ON SINGLE-MODE MULTI-FREQUENCY SIGNAL FUSION

(71) Applicant: Harbin Institute of Technology, Harbin (CN)

(72) Inventors: Bo Zhao, Harbin (CN); Jiubin Tan, Harbin (CN); Weijia Shi, Harbin (CN)

(73) Assignee: Harbin Institute of Technology, Harbin (CN)

( * ) Notice: Subject to any disclaimer, the term of this patent is extended or adjusted under 35 U.S.C. 154(b) by 517 days.

(21) Appl. No.: 17/704,099

(22) Filed: Mar. 25, 2022

(65) Prior Publication Data
US 2023/0228720 A1 Jul. 20, 2023

(30) Foreign Application Priority Data
Jan. 19, 2022 (CN) .......................... 202210061640.8

(51) Int. Cl.
*G01N 29/46* (2006.01)
*G01N 29/04* (2006.01)
*G01N 29/24* (2006.01)

(52) U.S. Cl.
CPC ........... *G01N 29/46* (2013.01); *G01N 29/041* (2013.01); *G01N 29/2437* (2013.01)

(58) Field of Classification Search
CPC ... G01N 29/46; G01N 29/041; G01N 29/2437
See application file for complete search history.

(56) References Cited

U.S. PATENT DOCUMENTS

| | | | |
|---|---|---|---|
| 2017/0315095 A1* | 11/2017 | Goldfine | G01N 27/9046 |
| 2020/0257933 A1* | 8/2020 | Steingrimsson | B22F 5/04 |
| 2021/0033552 A1* | 2/2021 | Potyrailo | G01N 33/2888 |

FOREIGN PATENT DOCUMENTS

CN 112326786 A 2/2021

* cited by examiner

*Primary Examiner* — Elias Desta
(74) *Attorney, Agent, or Firm* — IPRO, PLLC

(57) ABSTRACT

A method, system, device, and medium for online stress monitoring without baseline data based on single-mode multi-frequency signal fusion are provided. The method includes: establishing a dispersion curve according to geometric dimensions and material parameters of a measured object; then solving an approximate linear relationship between propagation time of S0 modes with different frequencies and stress at a fixed propagation distance by using a relationship between stress and group velocity, the obtained linear relationship being an acousto-elastic equation required for final measurement; then performing Hilbert transformation on an obtained signal, extracting a signal envelope, and determining arrival time of two excitation frequency signals by means of a peak extraction algorithm and a time domain width of an excitation signal; and calculating a propagation time ratio and substituting the propagation time ratio into a pre-calibrated acousto-elastic equation to solve a stress value of an object to be measured. The disclosure is advantageous in that the multi-frequency data is fused by using dispersion characteristics of a single-mode Lamb wave and an acousto-elastic effect, thereby achieving online stress monitoring without baseline data.

9 Claims, 4 Drawing Sheets

METHOD, SYSTEM, DEVICE, AND MEDIUM FOR ONLINE STRESS MONITORING WITHOUT BASELINE DATA BASED ON SINGLE-MODE MULTI-FREQUENCY SIGNAL FUSION

TECHNICAL FIELD

The disclosure belongs to the technical field of structural health monitoring, may be applied to the field of online stress monitoring of metallic materials and composite materials, and particularly relates to a method, system, device and medium for online stress monitoring without baseline data based on single-mode multi-frequency signal fusion.

BACKGROUND

In the aerospace field, a residual stress in mechanical structural members will work together with a loading stress in a service process, which causes the redistribution of stress and may lead to deformation, even cracks and other microdefects. When the members continue working in a complex cyclic stress state, the cracks will further extend, which may cause fatal damage such as member fracture. Therefore, in order to improve the usage safety of key structural members, it is of great significance to prevent the occurrence of safety accidents by monitoring a stress state inside the structural members in real time, analyzing a health status and predicting the fatigue life.

At present, utilization of a relationship between physical properties and stress for non-destructive stress measurement is the mainstream direction of stress research, including a magnetic noise method, a magnetic strain method, an X-ray diffraction method, and a neutron diffraction method. An ultrasonic method is widely used because of its simple measurement apparatus, wide application range and other unique advantages.

In 2019, Liu Haibo et al. disclosed "Ultrasonic Measurement Method for Surface Stress of Composite Material" in the disclosure patent CN110231116 A. In this method, an ultrasonic measurement device with a variable incident angle is designed. By adjusting a deflection angle of a transducer, it is possible to excite a critical refracted longitudinal wave in different directions of a composite material with anisotropy, and average stress measurement between transmitting and receiving probes is performed by using an acousto-elastic effect of the critical refracted longitudinal wave. In this method, on the basis of an adjustable incident angle, although the scope of application of a detection apparatus may be greatly improved, the propagation velocity of the longitudinal wave changes in the presence of stress and other environmental changes, and a critical angle of refraction cannot be accurately obtained. Therefore, a true critical refracted longitudinal wave cannot be excited, which results in inaccurate measurement results. Meanwhile, the entire measurement apparatus cannot be effectively fixed on a measured structure for a long time, so that this method is not suitable for online stress monitoring.

In 2020, Luo Jinheng et al. disclosed "Ultrasonic Stress Measurement Method based on Array Probes" in the disclosure patent CN111751032 A. Ultrasonic probes are arranged in a manner of one transmitting probe and multiple receiving probes, an average stress in spacer regions of receiving probes is calculated by measuring a change rate of propagation time between ultrasonic probe arrays as a discrete function, and then an average stress along an array distribution direction may be obtained by performing function differentiation. The method based on array probes can effectively improve the spatial resolution of measurement compared with the traditional one-transmitting and one-receiving method. Moreover, the rapid characterization under complex stress conditions can be avoided on the basis of rotating the probes in different directions. However, this method must pre-calibrate and store baseline data without stress. In practical use, the baseline data changes greatly and is not suitable for online monitoring of a stress state.

In 2021, Ding Hui et al. disclosed "Laser Ultrasonic Measurement Method for Residual Stress of Metal Additive Manufactured Parts" in the disclosure patent CN113218875 A. In this method, by means of the advantages of laser ultrasonic, such as long-distance monitoring, wide band, multi-mode waveform and many shapes of excitation sources, an ultrasonic surface wave is excited inside a metal additive, acousto-elastic coefficients of the metal additive in different directions are calibrated through a tensile test, and gradient distribution of a residual stress inside the additive is calculated by using a residual stress gradient model. Therefore, the problem that the distribution of a residual stress in a metal additive manufactured part is complex and difficult to detect is effectively solved. Although this method can realize the rapid and completely non-contact non-destructive detection of a residual stress in a measured part, an ultrasonic wave excited by laser mainly depends on a thermo-elastic effect or an ablation effect, which may cause some damage to the surface of the measured part. Meanwhile, the laser ultrasonic method is not suitable for real-time monitoring of a stress state due to its complex measurement device and high requirements of measurement conditions.

SUMMARY

In order to solve the problems in the prior art, the disclosure provides a method, system, device, and medium for online stress monitoring without baseline data based on single-mode multi-frequency signal fusion.

The disclosure is implemented by the following technical solution. The disclosure provides a method for online stress monitoring without baseline data based on single-mode multi-frequency signal fusion, including: firstly, establishing a dispersion curve of a Lamb wave according to a structure of a measured object, determining a cut-off frequency of a first-order Lamb wave mode to ensure that an excitation frequency of a Lamb signal is below a first-order cut-off frequency, and obtaining a pure S0-mode Lamb wave inside the measured object by means of symmetric excitation; then, obtaining a linear relationship between the S0-mode Lamb wave at different excitation frequencies and stress through theoretical analysis, and further determining a linear relationship between a propagation acoustic time ratio of the S0-mode Lamb wave at two excitation frequencies and stress at a fixed propagation distance; loading a chirp signal inside a signal generator according to a selected excitation frequency range, driving a transmitting probe after subjecting to a power amplifier, performing first-stage weak signal amplification on a signal of a receiving probe, receiving the signal by a high-speed acquisition board card, transmitting the signal to an upper computer through a PXIE bus, and storing the signal for data processing; and obtaining received signals under narrow-band excitation signals with different frequencies by calculating a transfer function of an entire measurement system, performing Hilbert transformation on the received signals, extracting a signal envelope, then determining propagation acoustic time of the S0-mode Lamb wave by using a peak extraction algorithm, solving a propagation acoustic time ratio of two excitation frequency signals, then determining an average stress between the transmitting and receiving probes by substituting into a pre-calibrated acousto-elastic equation, and finally characterizing a stress state of the measured object.

Further, the dispersion curve of the Lamb wave is established according to geometric dimensions and material parameters of the measured object, and a free plate Lamb wave dispersion equation is a Rayleigh-Lamb wave dispersion equation, satisfying:

$$\frac{\tan(qh)}{\tan(ph)} = -\frac{4k^2 pq}{(q^2 - k^2)^2} \quad (1)$$

$$\frac{\tan(qh)}{\tan(ph)} = -\frac{(q^2 - k^2)^2}{4k^2 pq} \quad (2)$$

where p and q are respectively expressed as:

$$p = \sqrt{\frac{\omega^2}{c_L^2} - k^2} \quad (3)$$

$$q = \sqrt{\frac{\omega^2}{c_T^2} - k^2} \quad (4)$$

where $c_L$ and $c_T$ respectively represent velocities of a longitudinal wave and a transverse wave, h represents half of plate thickness, $\omega$ is an angular frequency of an ultrasonic wave, and k is a wave number.

Further, a selected excitation signal is within a frequency range of 500 kHz-1000 kHz.

Further, a dispersion curve of the measured object under pre-stress conditions is solved through a semi-analytical finite element method to obtain wave numbers at different frequencies, the dispersion curve of the Lamb wave is finally completely drawn, and a relationship between the group velocity and frequency of the Lamb wave and the wave numbers satisfies:

$$c_g = \frac{d\omega}{dk} \quad (5)$$

A uniaxial pre-stress of 100 MPa is applied to the measured object along a propagation direction of the Lamb wave to obtain a group velocity change of the S0-mode Lamb wave at different frequencies.

The pre-stress of the measured object is set to linearly increase to 100 MPa at a step of 20 MPa from 0 MPa, a relationship between the stress and group velocity change of the S0-mode Lamb wave at 500 kHz and 1000 kHz is respectively obtained so as to establish a linear relationship between the uniaxial pre-stress and the group velocity of the S0-mode Lamb wave along the propagation direction during 500 kHz and 1000 kHz excitations according to the group velocity of the S0-mode Lamb wave without stress at two frequencies:

$$c_{g(500\ kHz)} = 4.463 \times 10^{-7}\sigma + 5432 \quad (6)$$

$$c_{g(1000\ kHz)} = 3.581 \times 10^{-7}\sigma + 4659 \quad (7)$$

where $\sigma$ represents stress.

According to formulas (6) and (7), a relationship between the propagation acoustic time ratio of the S0-mode Lamb wave and stress under 500 kHz and 1000 kHz excitations at a fixed propagation distance may be obtained as:

$$\frac{L/c_{g(500kHz)}}{L/c_{g(1000kHz)}} = \quad (8)$$

$$\frac{c_{g(1000kHz)}}{c_{g(500kHz)}} = \frac{3.581 \times 10^{-7}\sigma + 4659}{4.463 \times 10^{-7}\sigma + 5432} \approx -1.3411 \times 10^{-11}\sigma + 0.8577$$

The propagation acoustic time ratio of an S0 mode under 500 kHz and 1000 kHz excitations at a fixed propagation distance can be determined from formula (8) to have an approximate linear relationship with stress, so that average stress measurement on a propagation path of the Lamb wave is possible without baseline data by using data fusion at two excitation frequencies.

Further, after calibration of acousto-elastic coefficients of a single-mode multi-frequency Lamb wave is completed, a stress state of a measured structure is actually measured, an arbitrary waveform generator is used to generate a low-voltage chirp signal, after the signal is amplified by a power amplifier, a Lamb wave is generated for two excitation piezoelectric wafers, an S0-mode Lamb wave propagates inside the measured object and is received by a piezoelectric wafer sensor, a received signal is an mV-order weak signal which is subjected to non-distortion amplification, bandwidth filtering is then performed on the amplified signal, an original signal obtained by the piezoelectric wafer sensor is input into a high-bandwidth input amplification apparatus, the signal is amplified to an input range of a digital-to-analog conversion chip through coarse gain adjustment and fine gain adjustment, a lower cut-off frequency and an upper cut-off frequency of a filter are then set according to the bandwidth of an excitation signal, the amplified and filtered signal is input into a high-speed data acquisition system, and is encoded through an FPGA chip, and a sampling signal is transmitted to the upper computer through the PXIE bus and stored for subsequent data processing.

Further, a general transfer function of the measurement system is obtained according to the excitation signal and the received signal as:

$$H(\omega) = \frac{R_c(w)}{S_c(w)} \quad (9)$$

where $R_c(w)$ represents a Fourier transformation result of the received signal, and $S_c(w)$ represents a Fourier transformation result of the excitation signal.

Considering a 5-period sinusoidal excitation signal modulated by a Hanning window as excitation signal, the received signal of the sensor at this moment may be obtained according to the general transfer function of the measurement system as:

$$R_d(w) = H(\omega)S_d(w) \quad (10)$$

where $R_d(w)$ represents a Fourier transformation result of the received signal of the sensor, and $S_d(w)$ represents a Fourier transformation result of the excitation signal of the sensor.

A time-domain received waveform $R_d(t)$ corresponding to a modulated excitation signal is obtained by performing inverse Fourier transformation on $R_d(w)$, time-domain waveforms under 500 kHz and 1000 kHz excitations are respectively calculated, Hilbert transformation is then performed on the obtained signal, and the transformation process is defined as:

$$\hat{f}(t) = H[f(t)] = \frac{1}{\pi}\int_{-\infty}^{\infty}\frac{f(t)}{t-\tau}d\tau \quad (11)$$

where f(t) represents an original signal, f̂(t) represents a signal obtained after Hilbert transformation, and τ represents an integration variable.

After the Hilbert transformation, an amplitude envelope of the received signal is extracted, arrival time of the S0-mode directly arriving at a wave packet is determined by using the peak extraction algorithm, propagation time of the Lamb wave at a fixed distance is determined according to the width of the excitation signal, a propagation time ratio at two excitation frequencies is calculated, and the magnitude and direction of the uniaxial stress inside the measured object at this moment are determined by substituting into the calibrated acousto-elastic equation.

The disclosure also provides a system for online stress monitoring without baseline data based on single-mode multi-frequency signal fusion.

A dispersion curve establishment module, configured to firstly establish a dispersion curve of a Lamb wave according to a structure of a measured object, determine a cut-off frequency of a first-order Lamb wave mode to ensure that an excitation frequency of a Lamb signal is below a first-order cut-off frequency, and obtain a pure S0-mode Lamb wave inside the measured object by means of symmetric excitation.

An acousto-elastic equation establishment module, configured to obtain a linear relationship between the S0-mode Lamb wave at different excitation frequencies and stress through theoretical analysis, and further determine a linear relationship between a propagation acoustic time ratio of the S0-mode Lamb wave at two excitation frequencies and stress at a fixed propagation distance.

A measurement system integration module, configured to load a chirp signal inside a signal generator according to a selected excitation frequency range, drive a transmitting probe after subjecting to a power amplifier, perform first-stage weak signal amplification on a signal of a receiving probe, receive the signal by a high-speed acquisition board card, transmit the signal to an upper computer through a PXIE bus, and store the signal for data processing.

A stress calculation module, configured to obtain received signals under narrow-band excitation signals with different frequencies by calculating a transfer function of an entire measurement system, perform Hilbert transformation on the received signals, extract a signal envelope, then determine propagation acoustic time of the S0-mode Lamb wave by using a peak extraction algorithm, solve a propagation acoustic time ratio of two excitation frequency signals, then determine an average stress between the transmitting and receiving probes by substituting into a pre-calibrated acousto-elastic equation, and finally characterize a stress state of the measured object.

The disclosure also provides an electronic device, including a memory and a processor. The memory stores a computer program. The processor, when executing the computer program, implements the steps of the method for online stress monitoring without baseline data based on single-mode multi-frequency signal fusion.

The disclosure also provides a computer-readable storage medium storing computer instruction which, when executed by a processor, implements the steps of the method for online stress monitoring without baseline data based on single-mode multi-frequency signal fusion.

The disclosure has the following beneficial effects.

The disclosure is mainly advantageous in that the multi-frequency data is fused by using dispersion characteristics of a single-mode Lamb wave and an acousto-elastic effect of the Lamb wave, thereby achieving online stress monitoring without baseline data.

Firstly, a dispersion curve is established according to geometric dimensions and material parameters of a measured object, a cut-off frequency of a first-order Lamb wave mode is determined, a suitable frequency range is then selected in the cut-off frequency to excite a piezoelectric wafer, and a pure S0-mode Lamb wave is generated by means of symmetric excitation.

Then, dispersion curves under different pre-stresses are solved by using a semi-analytical finite element method, and a relationship between pre-stress at an excitation frequency and the group velocity change of an S0-mode Lamb wave at different frequencies is obtained by means of a linear fitting method. Next, an approximate linear relationship between propagation time of S0 modes with different frequencies at a fixed propagation distance and stress is solved by using a relationship between stress and group velocity, and the obtained linear relationship is an acousto-elastic equation required for final measurement.

Finally, a Lamb wave signal is excited and received inside a measured object, a transfer function of a system to be measured is calculated, and then time-domain received waveforms of modulation signals with different frequencies are calculated according to a spectrum of an expected excitation signal. Hilbert transformation is performed on the obtained signal, a signal envelope is extracted, and arrival time of two excitation frequency signals is determined by means of a peak extraction algorithm and a time domain width of an excitation signal. A propagation time ratio is calculated and substituted into a pre-calibrated acousto-elastic equation to solve an absolute stress value of an object to be measured.

DETAILED DESCRIPTION

The technical solutions in the examples of the disclosure are clearly and completely described below with reference to the drawings in the examples of the disclosure. It is apparent that the described examples are only a part of the examples of the disclosure, and are not all of the examples. Based on the examples of the disclosure, all other examples obtained by a person of ordinary skill in the art without involving any inventive effort all fall within the scope of the disclosure.

In view of the shortcomings of the existing methods, the disclosure is directed to an urgent need for online characterization of baseline-free stress, and discloses a method for online stress monitoring without baseline data based on single-mode multi-frequency signal fusion. On the basis of an acousto-elastic effect of a Lamb wave, data fusion at multiple excitation frequencies is realized by fully utilizing the dispersion characteristics of the Lamb wave, and finally stress measurement without baseline data is realized. According to geometric dimensions of a structure to be measured, a suitable excitation frequency range is selected, and a low-order mode Lamb wave is excited inside the measured structure. Because contour structures of S0- and A0-mode Lamb waves are different, the excitation of a single S0-mode Lamb wave is realized by symmetrically exciting upper and lower surfaces of the measured structure. Due to the dispersion characteristics of Lamb waves, acousto-elastic coefficients of S0-mode Lamb waves with different frequencies are different. Therefore, acoustic time changes of two excitation frequencies caused by stress are completely different at the same propagation distance. However, relationships between stress and group velocity at two excitation frequencies are linear. Therefore, it can be determined that there is still a linear relationship between a propagation acoustic time ratio of S0-mode Lamb waves with different frequencies and stress at a fixed propagation distance. Through the relationship, an absolute stress state of the measured object may be characterized, and data in a zero-stress state is not required as baseline data. In the method of the disclosure, it is very simple to excite and receive the Lamb wave, and it is only necessary to bond a common disk piezoelectric wafer sensor to a measured structure. Therefore, the method of the disclosure combines the acousto-elastic effects of Lamb waves with different modes, and can realize online stress monitoring without baseline data.

Figure 1:
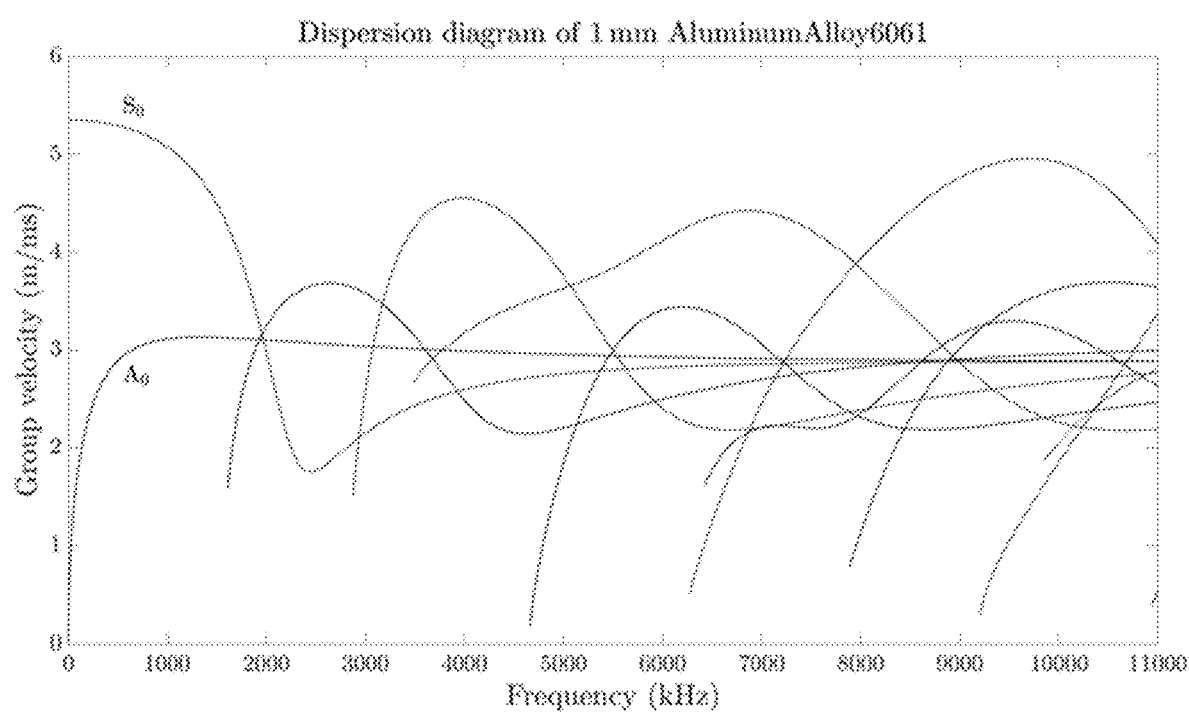
FIG. 1 is a schematic diagram of a group velocity dispersion curve of a 1 mm aluminum plate 6061.
Figure 2:
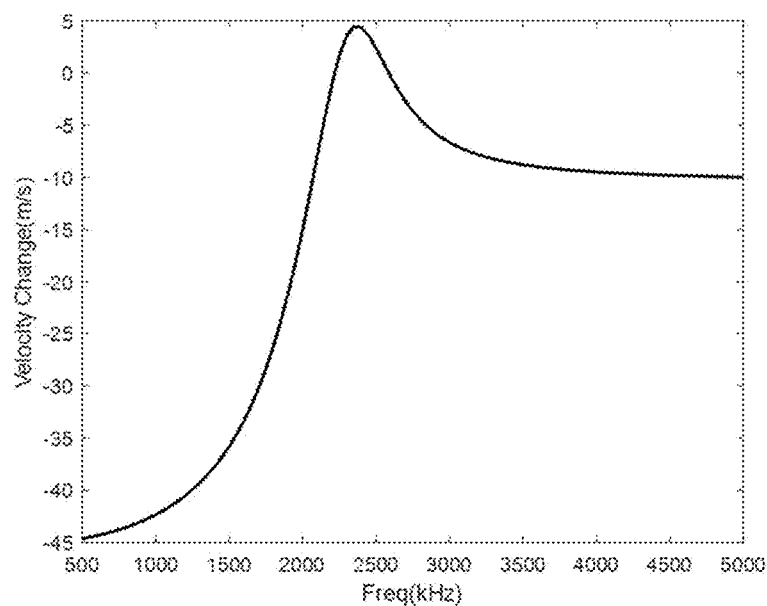
FIG. 2 is a schematic diagram of a group velocity change of an S0-mode Lamb wave under a uniaxial stress of 100 MPa.
Figure 3:
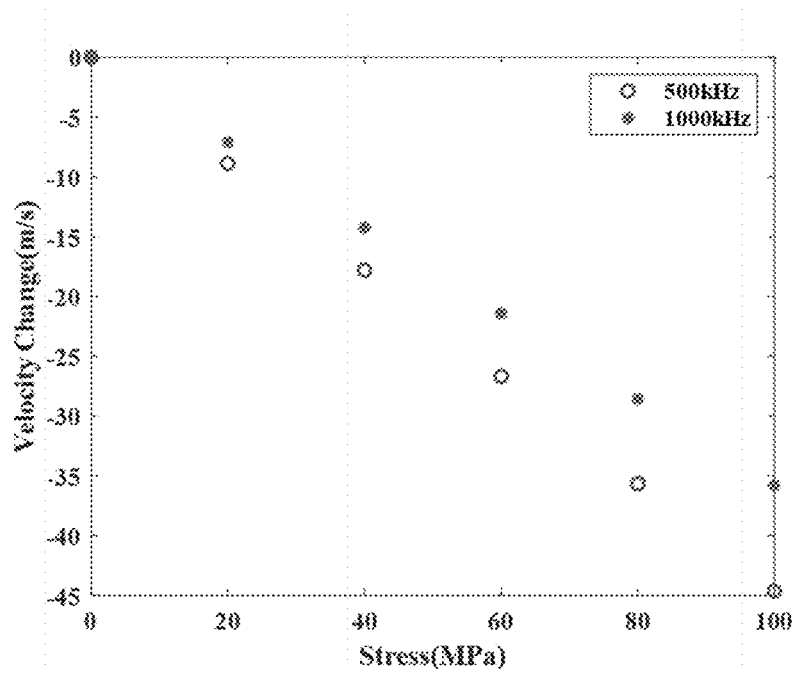
FIG. 3 is a schematic diagram of a group velocity change of an S0 mode caused by stress at 500 kHz and 1000 kHz.
Figure 4:
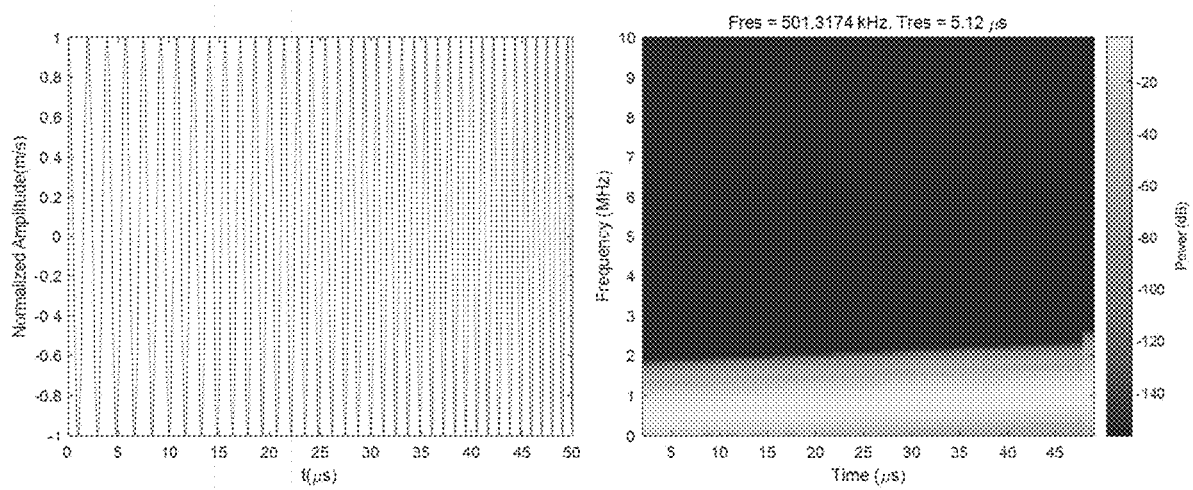
FIG. 4 is a time domain diagram and a time frequency diagram of a chirp signal.
Figure 5:
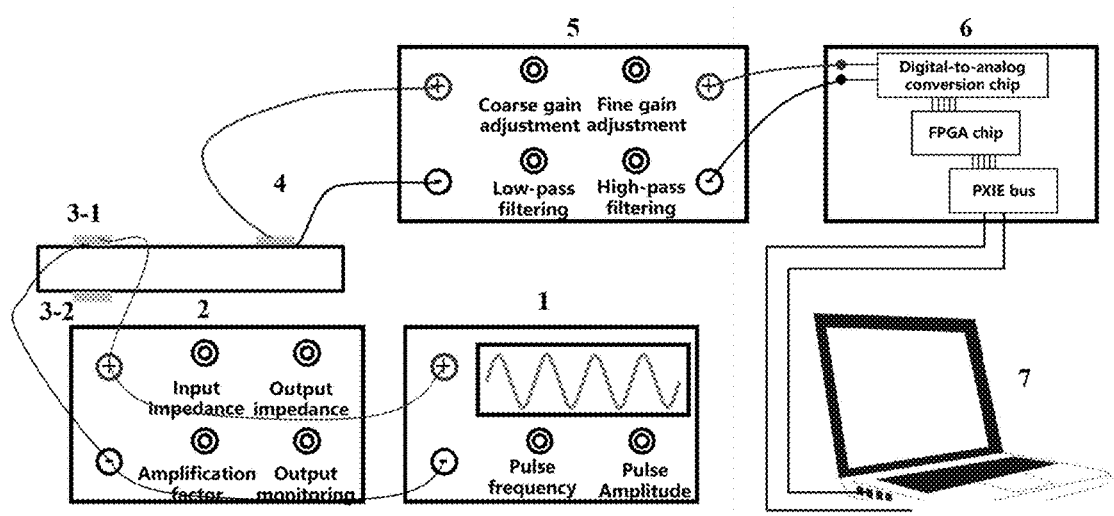
FIG. 5 is an integrated frame diagram of a measurement system, where 1—arbitrary waveform generator, 2—power amplifier, 3-1, 3-2—piezoelectric wafer exciter, 4—piezoelectric wafer sensor, 5—high-bandwidth receiving amplification apparatus, 6—single-channel high-speed data acquisition system, and 7—PC.
Figure 6:
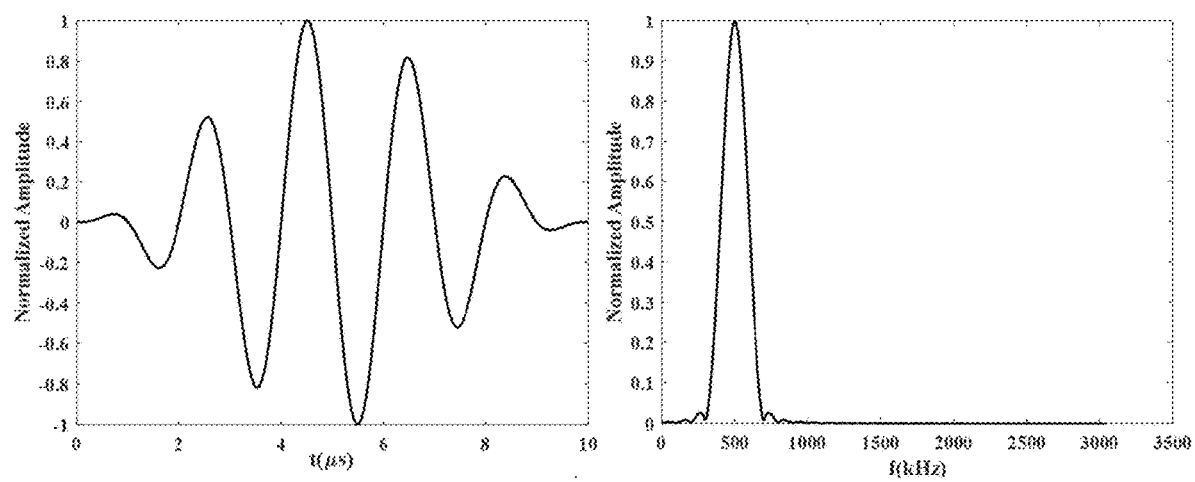
FIG. 6 is a time domain curve and frequency diagram of a 5-period sinusoidal excitation signal modulated by a Hanning window.

With reference to FIGS. 1-6, the disclosure provides a method for online stress monitoring without baseline data based on single-mode multi-frequency signal fusion. Firstly, a dispersion curve of a Lamb wave needs to be established according to a structure of a measured object, a cut-off frequency of a first-order Lamb wave mode is determined to ensure that an excitation frequency of a Lamb signal is below a first-order cut-off frequency, and a pure S0-mode Lamb wave is obtained inside the measured object by means of symmetric excitation. Then, a linear relationship between the S0-mode Lamb wave at different excitation frequencies and stress is obtained through theoretical analysis, and a linear relationship between a propagation acoustic time ratio of the S0-mode Lamb wave at two excitation frequencies and stress at a fixed propagation distance is further determined. A chirp signal is loaded inside a signal generator according to a selected excitation frequency range, a transmitting probe is driven after subjecting to a power amplifier, first-stage weak signal amplification is performed on a signal of a receiving probe, the signal is received by a high-speed acquisition board card and transmitted to an upper computer through a PXIE bus, and the signal is stored for data processing. Received signals under narrow-band excitation signals with different frequencies are obtained by calculating a transfer function of an entire measurement system, Hilbert transformation is performed on the received signals, a signal envelope is extracted, propagation acoustic time of the S0-mode Lamb wave is then determined by using a peak extraction algorithm, a propagation acoustic time ratio of two excitation frequency signals is solved, an average stress between the transmitting and receiving probes may be then determined by substituting into a pre-calibrated acousto-elastic equation, and a stress state of the measured object is finally characterized.

The dispersion curve of the Lamb wave is established according to geometric dimensions and material parameters of the measured object, and a free plate Lamb wave dispersion equation is a Rayleigh-Lamb wave dispersion equation, satisfying:

$$\frac{\tan(qh)}{\tan(ph)} = -\frac{4k^2 pq}{(q^2-k^2)^2} \quad (1)$$

$$\frac{\tan(qh)}{\tan(ph)} = -\frac{(q^2-k^2)^2}{4k^2 pq} \quad (2)$$

where p and q are respectively expressed as:

$$p = \sqrt{\frac{\omega^2}{c_L^2} - k^2} \quad (3)$$

$$q = \sqrt{\frac{\omega^2}{c_T^2} - k^2} \quad (4)$$

where $c_L$ and $c_T$ respectively represent velocities of a longitudinal wave and a transverse wave, h represents half of plate thickness, ω is an angular frequency of an ultrasonic wave, and k is a wave number.

Assuming that the object to be measured is an aluminum plate 6061 with a thickness of 1 mm, a dispersion curve of a structure to be measured may be obtained by solving equations (1) and (2). According to the dispersion curve, it can be determined that the cut-off frequency of the first-order Lamb wave mode is 1.6 MHz, and therefore a selected excitation signal is within a frequency range of 500 kHz-1000 kHz.

A dispersion curve of the measured object under pre-stress conditions is solved through a semi-analytical finite element method to obtain wave numbers at different frequencies, the dispersion curve of the Lamb wave is finally completely drawn, and a relationship between the group velocity and frequency of the Lamb wave and the wave numbers satisfies:

$$c_g = \frac{d\omega}{dk} \quad (5)$$

A uniaxial pre-stress of 100 MPa is applied to the measured object along a propagation direction of the Lamb wave to obtain a group velocity change of the S0-mode Lamb wave at different frequencies. The influence of the same stress on the group velocity of the Lamb wave at different frequencies is different, which indicates that the influence of stress on the Lamb wave also has the dispersion characteristics, and therefore fused data at multiple excitation frequencies may be used for stress measurement.

The pre-stress of the measured object is set to linearly increase to 100 MPa at a step of 20 MPa from 0 MPa, a relationship between the stress and group velocity change of the S0-mode Lamb wave at 500 kHz and 1000 kHz is respectively obtained so as to establish a linear relationship between the uniaxial pre-stress and the group velocity of the S0-mode Lamb wave along the propagation direction during 500 kHz and 1000 kHz excitations according to the group velocity of the S0-mode Lamb wave without stress at two frequencies:

$$c_{g(500\ kHz)} = 4.463 \times 10^{-7}\sigma + 5432 \tag{6}$$

$$c_{g(1000\ kHz)} = 3.581 \times 10^{-7}\sigma + 4659 \tag{7}$$

where σ represents stress.

According to formulas (6) and (7), a relationship between the propagation acoustic time ratio of the S0-mode Lamb wave and stress under 500 kHz and 1000 kHz excitations at a fixed propagation distance may be obtained as:

$$\frac{L/c_{g(500kHz)}}{L/c_{g(1000kHz)}} = \tag{8}$$

$$\frac{c_{g(1000kHz)}}{c_{g(500kHz)}} = \frac{3.581 \times 10^{-7}\sigma + 4659}{4.463 \times 10^{-7}\sigma + 5432} \approx -1.3411 \times 10^{-11}\sigma + 0.8577$$

The propagation acoustic time ratio of an S0 mode under 500 kHz and 1000 kHz excitations at a fixed propagation distance can be determined from formula (8) to have an approximate linear relationship with stress, so that average stress measurement on a propagation path of the Lamb wave is possible without baseline data by using data fusion at two excitation frequencies.

After calibration of acousto-elastic coefficients of a single-mode multi-frequency Lamb wave is completed, a stress state of a measured structure is actually measured, and an arbitrary waveform generator is used to generate a low-voltage chirp signal. After the signal is amplified by a power amplifier, a Lamb wave is generated for two excitation piezoelectric wafers, and an S0-mode Lamb wave propagates inside the measured object and is received by a piezoelectric wafer sensor. A received signal is an mV-order weak signal, which is easily interfered by random electronic noise, so that it is necessary to perform non-distortion amplification on an original signal and then perform bandwidth filtering on the amplified signal. The original signal obtained by the piezoelectric wafer sensor is input into a high-bandwidth input amplification apparatus, the signal is amplified to an input range of a digital-to-analog conversion chip through coarse gain adjustment and fine gain adjustment, a lower cut-off frequency and an upper cut-off frequency of a filter are then set according to the bandwidth of an excitation signal, the amplified and filtered signal is input into a high-speed data acquisition system, and is encoded through an FPGA chip, and a sampling signal is transmitted to the upper computer through the PXIE bus and stored for subsequent data processing.

A general transfer function of the measurement system is obtained according to the excitation signal and the received signal as:

$$H(\omega) = \frac{R_c(w)}{S_c(w)} \tag{9}$$

where $R_c(w)$ represents a Fourier transformation result of the received signal, and $S_c(w)$ represents a Fourier transformation result of the excitation signal.

Considering a 5-period sinusoidal excitation signal modulated by a Hanning window as excitation signal, the received signal of the sensor at this moment may be obtained according to the general transfer function of the measurement system as:

$$R_d(w) = H(\omega)S_d(w) \tag{10}$$

where $R_d(w)$ represents a Fourier transformation result of the received signal of the sensor, and $S_d(w)$ represents a Fourier transformation result of the excitation signal of the sensor.

A time-domain received waveform $R_d(t)$ corresponding to a modulated excitation signal is obtained by performing inverse Fourier transformation on $R_d(w)$, time-domain waveforms under 500 kHz and 1000 kHz excitations are respectively calculated, Hilbert transformation is then performed on the obtained signal, and the transformation process is defined as:

$$\hat{f}(t) = H[f(t)] = \frac{1}{\pi}\int_{-\infty}^{\infty}\frac{f(t)}{t-\tau}d\tau \tag{11}$$

where f(t) represents an original signal, $\hat{f}(t)$ represents a signal obtained after Hilbert transformation, and τ represents an integration variable.

After the Hilbert transformation, an amplitude envelope of the received signal is extracted, arrival time of the S0-mode directly arriving at a wave packet is determined by using the peak extraction algorithm, propagation time of the Lamb wave at a fixed distance is determined according to the width of the excitation signal, a propagation time ratio at two excitation frequencies is calculated, and the magnitude and direction of the uniaxial stress inside the measured object at this moment are determined by substituting into the calibrated acousto-elastic equation.

The disclosure also provides a system for online stress monitoring without baseline data based on single-mode multi-frequency signal fusion.

A dispersion curve establishment module, configured to firstly establish a dispersion curve of a Lamb wave according to a structure of a measured object, determine a cut-off frequency of a first-order Lamb wave mode to ensure that an excitation frequency of a Lamb signal is below a first-order cut-off frequency, and obtain a pure S0-mode Lamb wave inside the measured object by means of symmetric excitation.

An acousto-elastic equation establishment module, configured to obtain a linear relationship between the S0-mode Lamb wave at different excitation frequencies and stress through theoretical analysis, and further determine a linear relationship between a propagation acoustic time ratio of the S0-mode Lamb wave at two excitation frequencies and stress at a fixed propagation distance.

A measurement system integration module, configured to load a chirp signal inside a signal generator according to a selected excitation frequency range, drive a transmitting probe after subjecting to a power amplifier, perform first-stage weak signal amplification on a signal of a receiving probe, receive the signal by a high-speed acquisition board card, transmit the signal to an upper computer through a PXIE bus, and store the signal for data processing.

A stress calculation module, configured to obtain received signals under narrow-band excitation signals with different frequencies by calculating a transfer function of an entire measurement system, perform Hilbert transformation on the received signals, extract a signal envelope, then determine propagation acoustic time of the S0-mode Lamb wave by using a peak extraction algorithm, solve a propagation acoustic time ratio of two excitation frequency signals, then determine an average stress between the transmitting and receiving probes by substituting into a pre-calibrated acousto-elastic equation, and finally characterize a stress state of the measured object.

The disclosure also provides an electronic device, including a memory and a processor. The memory stores a computer program. The processor, when executing the computer program, implements the steps of the method for online stress monitoring without baseline data based on single-mode multi-frequency signal fusion.

The disclosure also provides a computer-readable storage medium storing computer instruction which, when executed by a processor, implements the steps of the method for online stress monitoring without baseline data based on single-mode multi-frequency signal fusion.

Under normal temperature conditions, a measured object is an aluminum plate 6061 with a thickness of 1 mm, which is an isotropic material. An arbitrary waveform generator is used to generate a chirp signal with a frequency range from 500 kHz to 1000 kHz. A low-frequency signal generated by a signal generator is amplified in one stage by an Aigtek power amplifier. A high-voltage signal is used to excite a piezoelectric wafer exciter while generating a trigger signal. A high-speed data acquisition board card is used to acquire an ultrasonic signal obtained by a piezoelectric wafer sensor. Before acquiring the received signal, the signal is subjected to weak amplification and band-pass filtering, the signal is amplified to an input voltage range of the data acquisition card, the received signal is continuously acquired for 20 times, and the acquired signal is subjected to smooth filtering to filter out a part of electronic noise, so as to improve a signal-to-noise ratio of the received signal. Then, a transfer function of a system is calculated, and received time domain waveforms under excitation signals with different frequencies are calculated according to a frequency domain transformation result of an expected signal. Propagation time of S0-mode Lamb waves with different frequencies is determined by using Hilbert transformation and a peak extraction algorithm, a propagation time ratio is substituted into a pre-calibrated acousto-elastic equation, and the obtained result is a uniaxial stress value of the measured object.

The disclosure provides a method for online monitoring of baseline-free stress based on single-mode multi-frequency Lamb wave signal fusion. The interaction of multi-frequency Lamb waves is innovatively considered, and an approximate linear relationship between a propagation time ratio of two mode waves and stress at a fixed propagation distance is obtained according to a linear relationship between group velocity of S0 modes with different frequencies and stress, so as to realize online monitoring of an absolute stress state of a measured structure without any reference baseline data.

The method, system, device, and medium for online stress monitoring without baseline data based on single-mode multi-frequency signal fusion provided by the disclosure is described in detail as above. The principles and examples of the disclosure are described by specific examples herein. The description of the above examples is only used to help understand the method and core idea of the disclosure. Meanwhile, for a person of ordinary skill in the art, according to the idea of the disclosure, there will be changes in the specific implementation mode and application scope of the disclosure. Based on the above, the content of the description shall not be construed as limiting the disclosure.

What is claimed is:

1. A method comprising:
    establishing a dispersion curve of a Lamb wave according to a structure of a measured object, determining a first-order cut-off frequency of a first-order Lamb wave mode wherein an excitation frequency of a Lamb signal is below the first-order cut-off frequency, and obtaining a pure S0-mode Lamb wave inside the measured object by symmetric excitation;
    obtaining a linear relationship between the S0-mode Lamb wave at different excitation frequencies and stress, and determining a linear relationship between a propagation acoustic time ratio of the S0-mode Lamb wave at two excitation frequencies and stress at a fixed propagation distance;
    loading a chirp signal inside a signal generator according to a selected excitation frequency range, driving a transmitting probe after subjecting to a power amplifier, performing first-stage weak signal amplification on a signal of a receiving probe, receiving the signal by an acquisition board, transmitting the signal to a computer through a PXIE bus, and storing the signal;
    and obtaining received signals under narrow-band excitation signals with different frequencies by calculating a transfer function of an entire measurement system, performing Hilbert transformation on the received signals, extracting a signal envelope, determining propagation acoustic time of the S0-mode Lamb wave by using a peak extraction algorithm, solving a propagation acoustic time ratio of two excitation frequency signals, determining an average stress between the transmitting and receiving probes by substituting into a pre-calibrated acousto-elastic equation, and characterizing a stress state of the measured object.

2. The method according to claim 1, wherein the dispersion curve of the Lamb wave is established according to geometric dimensions and material parameters of the measured object, and a free plate Lamb wave dispersion equation is a Rayleigh-Lamb wave dispersion equation, satisfying:

$$\frac{\tan(qh)}{\tan(ph)} = \frac{4k^2 pq}{(q^2 - k^2)^2} \quad (1)$$

$$\frac{\tan(qh)}{\tan(ph)} = \frac{(q^2 - k^2)^2}{4k^2 pq} \quad (2)$$

wherein p and q are respectively expressed as:

$$p = \sqrt{\frac{\omega^2}{c_L^2} - k^2} \quad (3)$$

$$q = \sqrt{\frac{\omega^2}{c_T^2} - k^2} \quad (4)$$

where $C_L$ and $C_T$ respectively represent velocities of a longitudinal wave and a transverse wave, h represents half of plate thickness, $\omega$ is an angular frequency of an ultrasonic wave, and k is a wave number.

3. The method according to claim 2, wherein a selected excitation signal is within a frequency range of 500 kHz-1000 kHz.

4. The method according to claim 3, wherein a dispersion curve of the measured object under pre-stress conditions is solved through a semi-analytical finite element method to obtain wave numbers at different frequencies, the dispersion curve of the Lamb wave is drawn, and a relationship between the group velocity and frequency of the Lamb wave and the wave numbers satisfies:

$$c_g = \frac{d\omega}{dk} \quad (5)$$

a uniaxial pre-stress of 100 MPa is applied to the measured object along a propagation direction of the Lamb wave to obtain a group velocity change of the S0-mode Lamb wave at different frequencies;

the pre-stress of the measured object is set to linearly increase to 100 MPa at a step of 20 MPa from 0 MPa, a relationship between the stress and group velocity change of the S0-mode Lamb wave at 500 kHz and 1000 kHz is respectively obtained so as to establish a linear relationship between the uniaxial pre-stress and the group velocity of the S0-mode Lamb wave along the propagation direction during 500 kHz and 1000 kHz excitations according to the group velocity of the S0-mode Lamb wave without stress at two frequencies:

$$C_{g(500\,kHz)} = 4.463 \times 10^{-7} \sigma + 5432 \quad (6)$$

$$C_{g(1000\,kHz)} = 3.581 \times 10^{-7} \sigma + 4659 \quad (7)$$

wherein $\sigma$ represents stress;

according to formulas (6) and (7), a relationship between the propagation acoustic time ratio of the S0-mode Lamb wave and stress under 500 kHz and 1000 kHz excitations at a fixed propagation distance may be obtained as:

$$\frac{L/c_{g(500kHz)}}{L/c_{g(1000kHz)}} = \frac{c_{g(1000kHz)}}{c_{g(500kHz)}} = \frac{3.581 \times 10^{-7}\sigma + 4659}{4.463 \times 10^{-7}\sigma + 5432} \approx -1.3411 \times 10^{-11}\sigma + 0.8577 \quad (8)$$

the propagation acoustic time ratio of an S0 mode under 500 kHz and 1000 kHz excitations at a fixed propagation distance can be determined from formula (8) to have an approximate linear relationship with stress, so that average stress measurement on a propagation path of the Lamb wave is possible without baseline data by using data fusion at two excitation frequencies.

5. The method according to claim 4, wherein after calibration of acousto-elastic coefficients of a single-mode multi-frequency Lamb wave is completed, a stress state of a measured structure is actually measured, an arbitrary waveform generator is used to generate a low-voltage chirp signal, after the signal is amplified by a power amplifier, a Lamb wave is generated for two excitation piezoelectric wafers, an S0-mode Lamb wave propagates inside the measured object and is received by a piezoelectric wafer sensor, a received signal is an mV-order weak signal which is subjected to non-distortion amplification, bandwidth filtering is performed on the amplified signal, an original signal obtained by the piezoelectric wafer sensor is input into a high-bandwidth input amplification apparatus, the signal is amplified to an input range of a digital-to-analog conversion chip through coarse gain adjustment and fine gain adjustment, a lower cut-off frequency and an upper cut-off frequency of a filter are set according to the bandwidth of an excitation signal, the amplified and filtered signal is input into a data acquisition system, and is encoded through an FPGA chip, and a sampling signal is transmitted to the computer through the PXIE bus and stored for subsequent data processing.

6. The method according to claim 5, wherein a general transfer function of the measurement system is obtained according to the excitation signal and the $$H(\omega) = \frac{R_c(w)}{S_c(w)} \quad (9)$$

where $R_c(w)$ represents a Fourier transformation result of the received signal, and $S_c(w)$ represents a Fourier transformation result of the excitation signal;

considering a 5-period sinusoidal excitation signal modulated by a Hanning window as excitation signal, the received signal of the sensor at this moment may be obtained according to the general transfer function of the measurement system as:

$$R_d(w) = H(\omega)S_d(w) \quad (10)$$

where $R_d(w)$ represents a Fourier transformation result of the received signal of the sensor, and $S_d(w)$ represents a Fourier transformation result of the excitation signal of the sensor;

a time-domain received waveform $R_d(t)$ corresponding to a modulated excitation signal is obtained by performing inverse Fourier transformation on $R_d(w)$, time-domain waveforms under 500 kHz and 1000 kHz excitations are respectively calculated, Hilbert transformation is performed on the obtained signal, and the transformation process is defined as:

$$\hat{f}(t) = H[f(t)] = \frac{1}{\pi}\int_{-\infty}^{\infty}\frac{f(t)}{t-\tau}d\tau \quad (11)$$

where $f(t)$ represents an original signal, $\hat{f}(t)$ represents a signal obtained after Hilbert transformation, and $\tau$ represents an integration variable;

after the Hilbert transformation, an amplitude envelope of the received signal is extracted, arrival time of the S0-mode directly arriving at a wave packet is determined by using the peak extraction algorithm, propagation time of the Lamb wave at a fixed distance is determined according to the width of the excitation signal, a propagation time ratio at two excitation frequencies is calculated, and the magnitude and direction of the uniaxial stress inside the measured object at this moment are determined by substituting into the calibrated acousto-elastic equation.

7. A system comprising:

a dispersion curve establishment module, configured to establish a dispersion curve of a Lamb wave according to a structure of a measured object, determine a cut-off frequency of a first-order Lamb wave mode to ensure that an excitation frequency of a Lamb signal is below a first-order cut-off frequency, and obtain a pure S0-mode Lamb wave inside the measured object by means of symmetric excitation;

an acousto-elastic equation establishment module, configured to obtain a linear relationship between the S0-mode Lamb wave at different excitation frequencies and stress through theoretical analysis, and further determine a linear relationship between a propagation acoustic time ratio of the S0-mode Lamb wave at two excitation frequencies and stress at a fixed propagation distance;

a measurement system integration module, configured to load a chirp signal inside a signal generator according to a selected excitation frequency range, drive a transmitting probe after subjecting to a power amplifier, perform first-stage weak signal amplification on a signal of a receiving probe, receive the signal by an acquisition board card, transmit the signal to a computer through a PXIE bus, and store the signal for data processing; and a stress calculation module, configured to obtain received signals under narrow-band excitation signals with different frequencies by calculating a transfer function of an entire measurement system, perform Hilbert transformation on the received signals, extract a signal envelope, determine propagation acoustic time of the S0-mode Lamb wave by using a peak extraction algorithm, solve a propagation acoustic time ratio of two excitation frequency signals, determine an average stress between the transmitting and receiving probes by substituting into a pre-calibrated acousto-elastic equation, and characterize a stress state of the measured object.

8. An electronic device, comprising a non-transitory memory and a processor, the non-transitory memory storing a computer program, wherein the processor, when executing the computer program, implements the steps of the method according to claim 1.

9. A non-transitory computer-readable storage medium storing computer instruction which, when executed by a processor, implements the steps of the method according to claim 1.

* * * * *